No. 838,882.  
PATENTED DEC. 18, 1906.

R. L. MORGAN.  
FLEXIBLE SHAFT.  
APPLICATION FILED APR. 21, 1905.

Witnesses  
Roy D. Tolman.  
Penelope Comberbach.

Inventor  
Ralph L. Morgan  
By Rufus B. Fowler  
Attorney

UNITED STATES PATENT OFFICE.

RALPH L. MORGAN, OF WORCESTER, MASSACHUSETTS.

FLEXIBLE SHAFT.

No. 838,882.  Specification of Letters Patent.  Patented Dec. 18, 1906.

Application filed April 21, 1905. Serial No. 256,813.

*To all whom it may concern:*

Be it known that I, RALPH L. MORGAN, a citizen of the United States, residing at Worcester, in the county of Worcester and Commonwealth of Massachusetts, have invented a new and useful Improvement in a Flexible Shaft, of which the following is a specification, accompanied by drawings forming a part of the same, in which—

Figure 1:
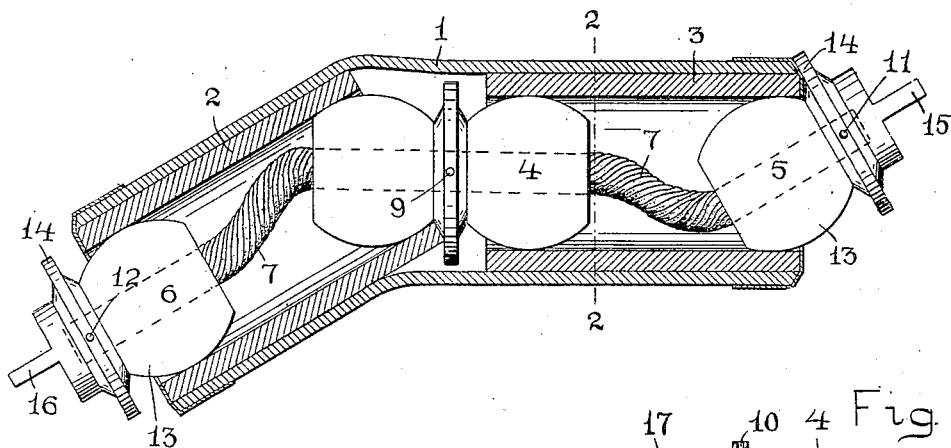
Figure 2:
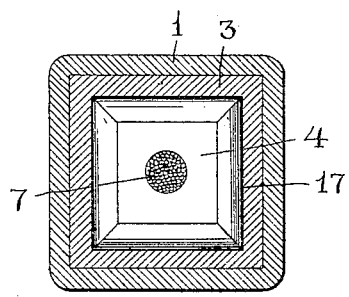
Figure 4:
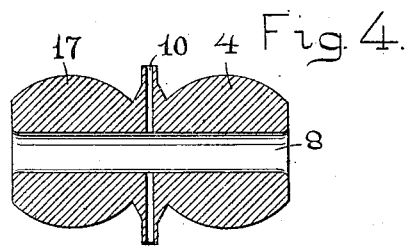
Figure 3:
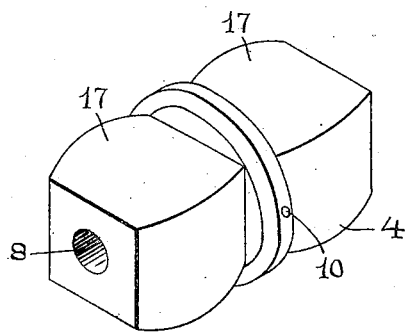

Figure 1 represents a central longitudinal sectional view of a flexible shaft embodying my invention. Fig. 2 is a transverse sectional view on line 2 2, Fig. 1. Fig. 3 is a detached perspective view of a central link, and Fig. 4 is a central longitudinal sectional view of a central link.

Similar reference-figures refer to similar parts in the different views.

My present invention relates to certain novel features of construction in flexible shafts by which rotary motion may be communicated at varying angles; and it consists in the construction and arrangement of parts, as hereinafter described, and pointed out in the annexed claims.

Referring to the accompanying drawings, Figure 1 represents a short piece of flexible shafting embodying my invention, in which 1 denotes the outer flexible casing or envelop, such as is usually employed for inclosing flexible shafts. 2 3 denote short rectangular tubular links by which the central links 4, 5, and 6 are inclosed. As the links 2 and 3 are rectangular, the casing 1 rotates with the shaft, and thus forms part of it. The central links 4, 5, and 6 are connected by a flexible cable 7, having its ends attached to the links 5 and 6 and passing through a longitudinal hole 8 in the link 4, to which it is attached by a pin 9, inserted in the transverse hole 10 of the link 4 and between the strands of the cable 7. Similar pins 11 and 12 may be used to attach the ends of the cable 7 to the links 5 and 6. The links 5 and 6 comprise metal blocks 13, which are rectangular in their cross-section, but are provided with curved sides fitting the rectangular tubular links 3 and capable of a slight rocking motion therein. Integral with the blocks 13 are disks 14, having diametrical holes to receive the pins 11 and 12, and projecting from the links 5 and 6 are the shanks 15 and 16, adapted to receive or impart rotary motion by which the shaft is rotated. If rotary motion is imparted to the shank 15, it will be transmitted from the link 5 to the rectangular tube 3 and from the rectangular tube 3 to the link 4, from the link 4 to the rectangular tube 2 and from the rectangular tube 2 to the link 6 and shank 16, which may be operatively connected with the device to be driven.

The flexible cable 7 maintains the links 4, 5, and 6 at a uniform distance apart and inclosed within the ends of the rectangular links 2 and 3. The curved sides 17 of the central links 4, 5, and 6 render the links capable of a slight rocking motion within the ends of the rectangular tubular links 2 and 3, thereby allowing the axes of the several links to be varied without interfering with their rotary motion.

What I claim as my invention, and desire to secure by Letters Patent, is—

1. In a flexible shaft, the combination of outer tubular links having a uniform bore, inner links inclosed in the ends of said outer links and arranged to impart rotation to said outer links, and a flexible connection attached to each of said inner links.

2. In a flexible shaft, the combination of outer rectangular links, inner links inclosed in the ends of said outer links, said inner links being rectangular in cross-section whereby the rotation of said inner links is imparted to said outer links, and a flexible connection between each pair of said inner links.

3. In a flexible shaft, the combination of outer tubular links, inner links inclosed in the ends of said outer links, said inner links being arranged to impart rotation to said outer links and capable of a rocking motion therein, a flexible connection attached to each of said inner links.

RALPH L. MORGAN.

Witnesses:
 PENELOPE COMBERBACH,
 RUFUS B. FOWLER.